(12) United States Patent
Komamaki

(10) Patent No.: US 8,913,235 B2
(45) Date of Patent: Dec. 16, 2014

(54) FIBER MEASUREMENT DEVICE

(75) Inventor: Moritoshi Komamaki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 13/517,717

(22) Filed: Jun. 14, 2012

(65) Prior Publication Data

US 2013/0021598 A1 Jan. 24, 2013

(30) Foreign Application Priority Data

Jul. 19, 2011 (JP) .................. 2011-157950

(51) Int. Cl.
*G01N 21/00* (2006.01)
*G01M 11/00* (2006.01)
(52) U.S. Cl.
CPC ...... *G01M 11/3145* (2013.01); *G01M 11/3136* (2013.01)
USPC ...................................................... 356/73.1
(58) Field of Classification Search
USPC ........................................................ 356/73.1
See application file for complete search history.

(56) References Cited

U.S. PATENT DOCUMENTS

| | | | | |
|---|---|---|---|---|
| 5,543,912 A | * | 8/1996 | Kada et al. | 356/73.1 |
| 5,999,289 A | * | 12/1999 | Ihara et al. | 398/147 |
| 6,542,228 B1 | * | 4/2003 | Hartog | 356/73.1 |

FOREIGN PATENT DOCUMENTS

| | | |
|---|---|---|
| JP | 03195939 A | 8/1991 |
| JP | 04132931 A | 5/1992 |
| JP | 2841903 B2 | 12/1998 |
| JP | 2006184038 A | 7/2006 |

* cited by examiner

*Primary Examiner* — Tarifur Chowdhury
*Assistant Examiner* — Omar Nixon
(74) *Attorney, Agent, or Firm* — Lowe Hauptman & Ham, LLP

(57) ABSTRACT

A fiber measurement device includes: a light detector adapted to detect feedback light of laser light output to a fiber; a band limiting circuit adapted to extract, from a signal depending on the feedback light, a signal having a component corresponding to a frequency of the laser light, wherein the signal extracted by the band limiting circuit is a first differentiation target signal; and a waveform equalizing circuit having a differentiating and adding circuit adapted to differentiate the first differentiation target signal to generate a first differentiation result signal and to add the first differentiation target signal and the first differentiation result signal.

7 Claims, 10 Drawing Sheets

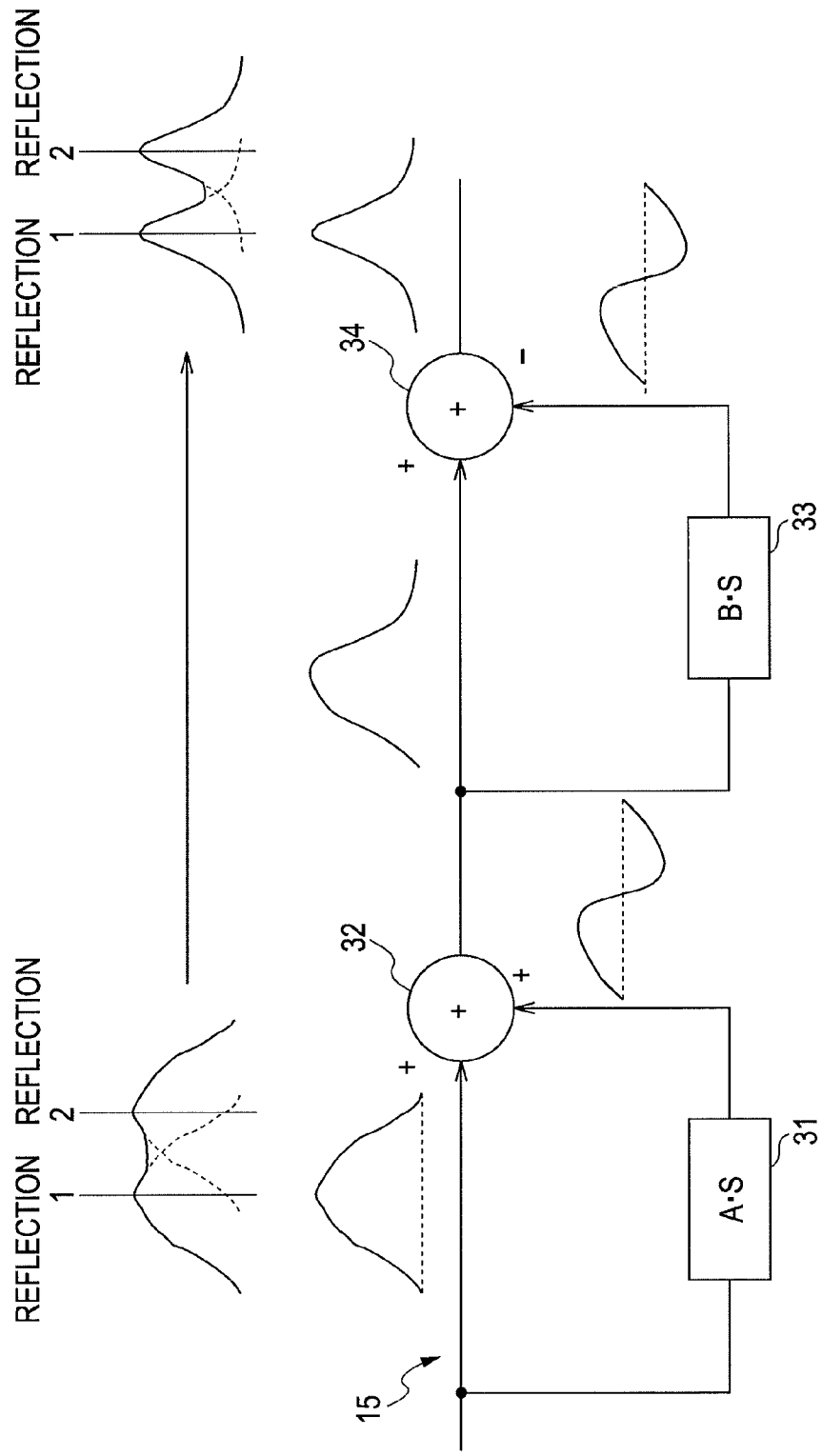

FIBER MEASUREMENT DEVICE

CROSS-REFERENCE TO RELATED APPLICATION

This application claims priority from Japanese Patent Application No. 2011-157950 filed with the Japan Patent Office on Jul. 19, 2011, the entire content of which is hereby incorporated by reference.

BACKGROUND

1. Technical Field

The present disclosure relates to a fiber measurement device for measuring characteristics of an optical fiber.

2. Related Art

An OTDR (Optical Time Domain Reflectometer) is known as a device for measuring characteristics of an optical fiber (hereinafter referred to as a fiber). The OTDR inputs a light pulse (laser light) from a laser light source to a fiber and then detects backscattered light (Rayleigh scattered light) and Fresnel reflected light from the fiber. Thereby, the OTDR measures and displays a loss distribution state of the fiber.

FIG. 9 shows a fiber measurement device 101 as an example of a conventional OTDR. In FIG. 9, the fiber measurement device 101 measures a loss distribution state of a fiber 102. The fiber measurement device 101 has a driver circuit 103, a laser diode 104, an optical coupler 105, a photodetector 106, a signal amplifier circuit 107, a control processing circuit 108 and a display device 109.

The driver circuit 103 supplies driving power to the laser diode 104. The laser diode 104 uses the driving power to emit laser light. The optical coupler 105 is a means for branching the laser light. The optical coupler 105 transfers the laser light emitted from the laser diode 104 to the fiber 102. In the fiber 102, backscattered light and Fresnel reflected light are generated. The generated light is reflected by the optical coupler 105 to be input to the photodetector 106.

The photodetector 106 detects laser light to generate a current by photoelectric conversion. The generated current is converted to a voltage signal. The voltage signal is amplified by the signal amplifier circuit 107. The control processing circuit 108 performs predetermined signal processing on the amplified voltage signal. Then, the processed signal is displayed on the display device 109. Moreover, the control processing circuit 108 controls the driver circuit 103 to control the emission of the laser light.

FIG. 10 shows backscattered light level displayed on the display device 109 in a case where the fiber 102 has a fusion splice point, a connection point (connector) and a bending loss point. Here, an end of the fiber 102 is an open end. As shown in FIG. 10, the backscattered light level regarding the laser light input to the fiber 102 changes greatly at respective positions of the fusion splice point, the connection point (connector) and the bending loss point of the fiber 102. Moreover, the backscattered light level changes much further at the open end.

The graph shown in FIG. 10 shows the loss distribution state of the fiber 102. The loss distribution state is displayed on the display device 109, and thereby characteristics of the fiber 102 can be recognized. A photon counting method is known as another method for measuring characteristics of a fiber. According to the photon counting method, the number of photons that is proportional to light intensity of laser light fed back from the fiber is counted and then photon probability is used for revealing the characteristics of the fiber. A combined technique of the photon counting method and the method of the OTDR is disclosed in JP-A-2006-184038.

SUMMARY

A fiber measurement device includes: a light detector adapted to detect feedback light of laser light output to a fiber; a band limiting circuit adapted to extract, from a signal depending on the feedback light, a signal having a component corresponding to a frequency of the laser light, wherein the signal extracted by the band limiting circuit is a first differentiation target signal; and a waveform equalizing circuit having a differentiating and adding circuit adapted to differentiate the first differentiation target signal to generate a first differentiation result signal and to add the first differentiation target signal and the first differentiation result signal.

BRIEF DESCRIPTION OF DRAWINGS

FIG. 4 is a diagram of an example of a waveform equalizing circuit and waveform;

DETAILED DESCRIPTION

Figure 1:
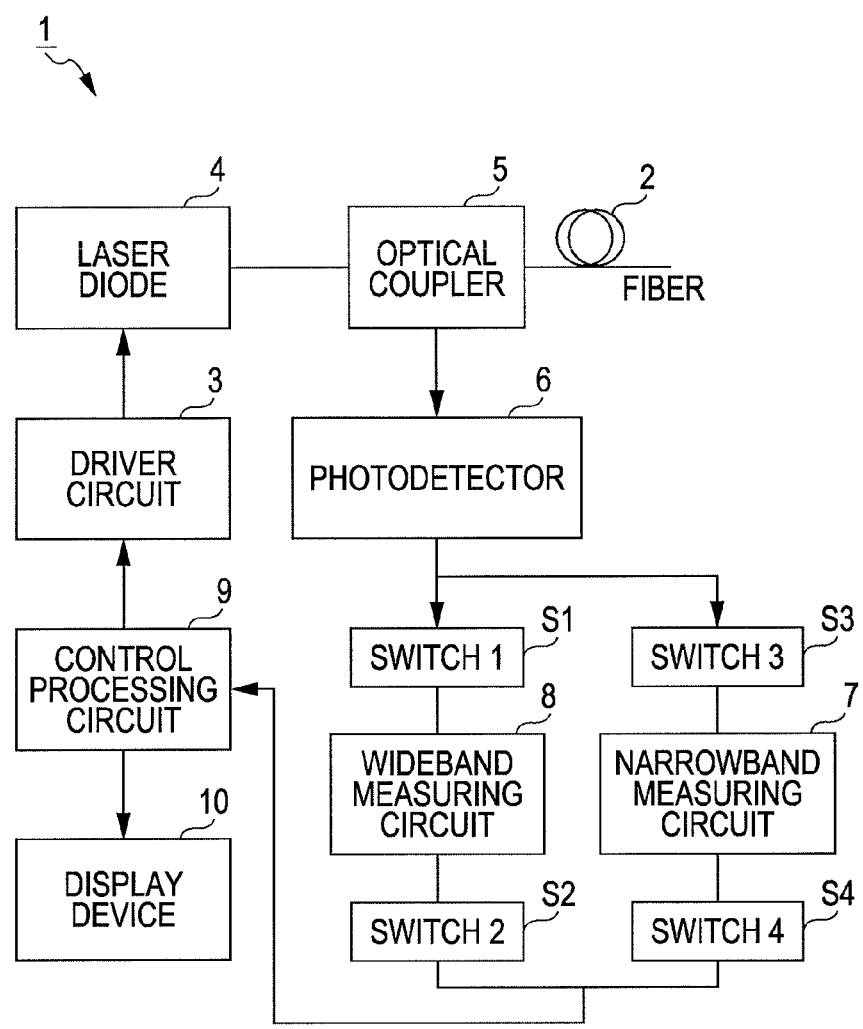
FIG. 1 is a block diagram of a configuration of a fiber measurement device according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the OTDR, both characteristics of a fiber (long distance fiber) at a position distant from the measurement device (about 100 km) and characteristics of a fiber (short distance fiber) at a position close to the measurement device (about 500 m) can be measured. In a case where the characteristics of the long distance fiber are measured, power of the laser light is increased. Therefore, a non-linear optical phenomenon such as stimulated Brillouin scattering is caused. As a result, resolution of a measurement is deteriorated.

Moreover, when the power of the laser light is increased in order to measure the characteristics of the long distance fiber, a level adjustment circuit such as an attenuator circuit and a limiter circuit is provided. Mismatch of such the level adjustment circuit and another circuit causes ringing. The ringing further deteriorates the resolution of the measurement. A smoothing circuit may be provided in order to avoid the ringing. However, the smoothing circuit deteriorates the resolution of the measurement (resolution of the measured signal).

Furthermore, when measuring the characteristics of the long distance fiber, the fiber measurement device increases signal amplification degree. Here, product of signal amplification degree (gain) and signal frequency bandwidth, namely the so-called GB product is constant. Therefore, when the signal amplification degree is increased, measurable frequency bandwidth becomes narrower accordingly. This also causes deterioration in the resolution of the measurement.

As described above, although the OTDR can measure the characteristics of the long distance fiber, the resolution of the measurement is low.

Meanwhile, the above-mentioned JP-A-2006-184038 discloses a device based on the photon counting method. According to the photon counting method, weak power light pulse is used in order to perform a high-resolution measurement. Therefore, a measurable fiber position is close to a light source. That is, the photon counting method is for measuring the characteristics of the short distance fiber with high resolution.

According to the technique described in JP-A-2006-184038, the method of the OTDR and the photon counting method are combined. That is, according to the technique, an operation mode is switched between an OTDR mode and a photon counting mode. However, the characteristics of the long distance fiber cannot be measured with high resolution by this technique.

An object of the present disclosure is to measure the characteristics of the long distance fiber with high resolution.

A fiber measurement device has: a light detector adapted to detect feedback light of laser light output to a fiber; a band limiting circuit adapted to extract, from a signal depending on the feedback light, a signal having a component corresponding to a frequency of the laser light, wherein the signal extracted by the band limiting circuit is a first differentiation target signal; and a waveform equalizing circuit having a differentiating and adding circuit adapted to differentiate the first differentiation target signal to generate a first differentiation result signal and to add the first differentiation target signal and the first differentiation result signal.

The fiber measurement device has the band limiting circuit and the waveform equalizing circuit. As a result, characteristics of the fiber can be measured with high resolution. Moreover, in the fiber measurement device, high-power laser light can be used. Therefore, reflection characteristics of the long distance fiber can be measured. Furthermore, the fiber measurement device need not have a complicated processing circuit. Thus, the characteristics of the fiber can be measured in real time by simple processing by a simple circuit.

A signal obtained by adding the first differentiation target signal and the first differentiation result signal is a second differentiation target signal. The waveform equalizing circuit may further have a differentiating and subtracting circuit adapted to differentiate the second differentiation target signal to generate a second differentiation result signal and to subtract the second differentiation result signal from the second differentiation target signal.

Rising edge of waveform can be clearly detected by the differentiating and adding circuit described above. On the other hand, falling edge of waveform can be clearly detected by the differentiating and subtracting circuit. Therefore, the resolution of the measurement can be further increased by using the differentiating and subtracting circuit.

Moreover, the fiber measurement device may further have: a narrowband measuring circuit having the band limiting circuit and the waveform equalizing circuit; a wideband measuring circuit adapted to amplify the feedback light from the fiber and used for measuring characteristics of the fiber based on loss of the feedback light; and a switch adapted to switch between the narrowband measuring circuit and the wideband measuring circuit to determine which circuit is to be used.

In this case, when the characteristics of the long distance fiber are measured with high resolution, the switch is controlled such that the narrowband measuring circuit is selected. On the other hand, when the characteristics of the fiber with regard to a wide frequency bandwidth are measured, the switch is controlled such that the wideband measuring circuit is used. As a result, a single fiber measurement device can achieve both the measurement of the characteristics of the long distance fiber with high resolution and the measurement of the characteristics of the fiber with regard to a wide frequency bandwidth.

In addition, the fiber measurement device may further have a bias circuit adapted to bias the first differentiation target signal.

Due to such the bias circuit, a peak level of the signal can be recognized. As a result, the peak level can be displayed by using an arbitrary display device.

As described above, the fiber measurement device has the band limiting circuit and the waveform equalizing circuit. Therefore, signals interfering with each other can be separated and distinguished from each other. As a result, the characteristics of the fiber can be measured with high resolution. Moreover, high-power laser light can be used. Therefore, the characteristics of the long distance fiber can be measured. Furthermore, the fiber measurement device can measure the characteristics of the fiber in real time by simple processing by simple hardware (analog circuit).

An embodiment of the present disclosure will be described below with reference to the accompanying drawings. FIG. 1 shows a fiber measurement device 1. The fiber measurement device 1 is a kind of optical pulse tester and measures characteristics of a fiber 2 as an optical fiber.

The fiber measurement device 1 has a driver circuit 3, a laser diode 4, an optical coupler 5, a photodetector 6, a narrowband measuring circuit 7, a wideband measuring circuit 8, a control processing circuit 9 and a display device 10. Switches S1 and S2 are respectively provided at the former stage and the latter stage of the wideband measuring circuit 8. Switches S3 and S4 are respectively provided at the former stage and the latter stage of the narrowband measuring circuit 7. Each of the switches S1 to S4 may be achieved by a multiplexer and the like.

The driver circuit 3 supplies driving power to the laser diode 4. The laser diode 4 emits laser light with a predetermined pulse width. The laser diode 4 operates by using the driving power supplied from the driver circuit 3. The optical coupler 5 is a member for branching the laser light. The laser light emitted from the laser diode 4 is transferred by the optical coupler 5 to the fiber 2. The laser light input to the fiber 2 is partially reflected in the fiber 2 to be feedback light. The feedback light includes totally reflected light, backscattered light (Rayleigh scattered light), Fresnel reflected light and the like in the fiber 2.

The feedback light is transferred by the optical coupler 5 to the photodetector 6 and detected by the photodetector 6. The photodetector 6 photoelectric-converts the feedback light to generate a current. The generated current is input to the narrowband measuring circuit 7 or the wideband measuring circuit 8 through control by the use of the switches S1 and S3.

Figure 2:
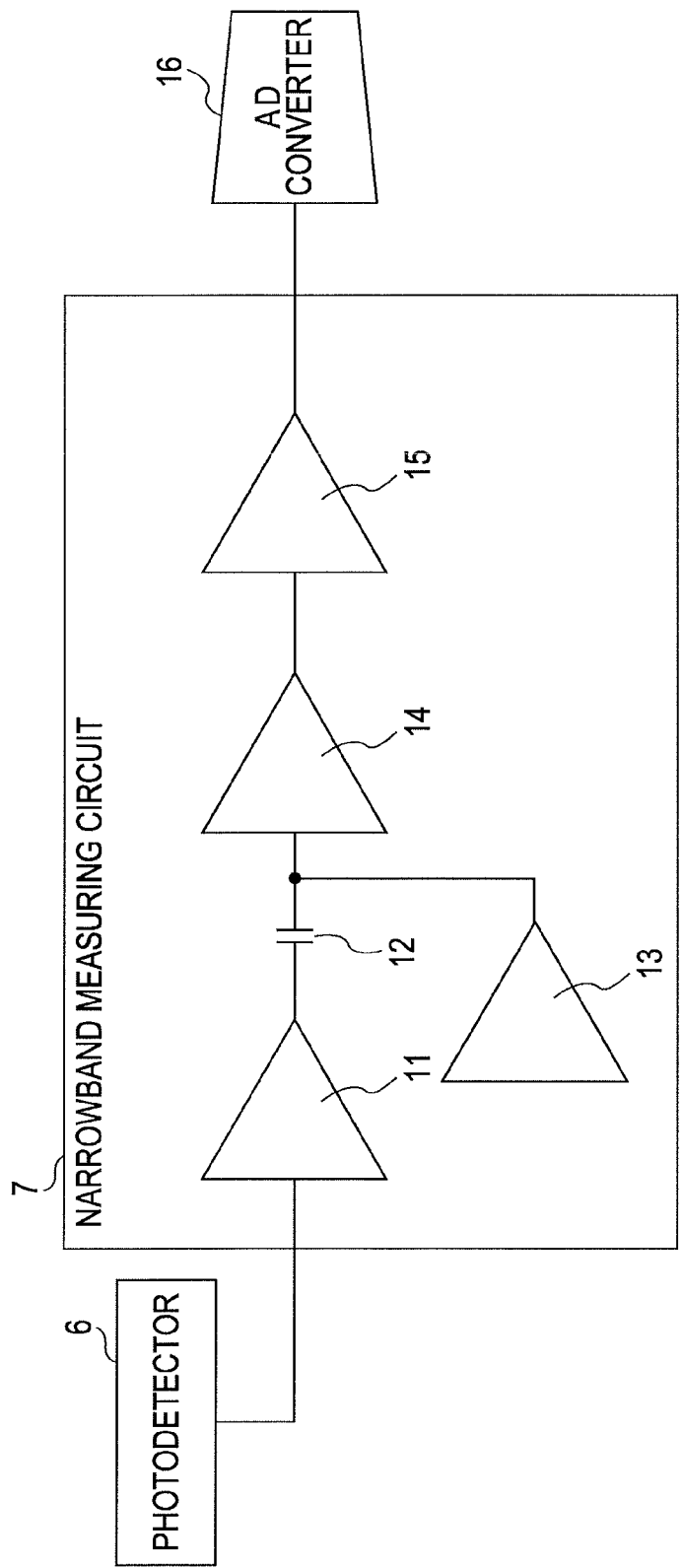
FIG. 2 is a block diagram of a configuration of a narrowband measuring circuit.

The narrowband measuring circuit 7 measures reflection characteristics of a long distance fiber (i.e. a fiber at a position distant from the fiber measurement device 1) with high resolution. FIG. 2 shows the narrowband measuring circuit 7. The narrowband measuring circuit 7 has a converter and amplifier circuit 11, a band limiting circuit 12, a bias circuit 13, an amplifier circuit 14 and a waveform equalizing circuit 15. Moreover, an AD converter 16 is connected to the waveform equalizing circuit 15.

The converter and amplifier circuit 11 converts the current generated by the photodetector 6 into a voltage signal. The band limiting circuit 12 extracts, from the voltage signal, a signal having a component corresponding to a frequency (i.e. frequency depending on pulse width) of the laser light. That is, the band limiting circuit 12 is a bandpass filter. In the present embodiment, the band limiting circuit 12 is achieved by a capacitor. The bias circuit 13 is a circuit for generating DC bias.

Figure 3A:
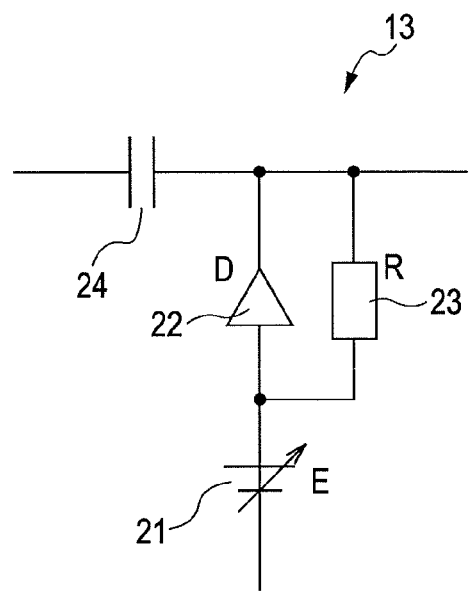
FIG. 3A is a diagram of an example of a bias circuit.

FIG. 3A shows an example of the bias circuit 13. The bias circuit 13 is a diode clamping circuit. The bias circuit 13 has a variable voltage source 21, a diode 22, a resistor 23 and a capacitor 24. The variable voltage source 21 can change a supply voltage E. The supply voltage E is a bias voltage and can be superimposed on the voltage signal.

As shown in FIG. 2, passband of the voltage signal is limited by the band limiting circuit 12. The bias voltage is superimposed by the bias circuit 13 on the voltage signal output from the band limiting circuit 12. Then, the voltage signal is input to the amplifier circuit 14. The amplifier circuit 14 amplifies the voltage signal and outputs the amplified voltage signal to the waveform equalizing circuit 15.

FIG. 4 shows a pulse streaming circuit as an example of the waveform equalizing circuit 15. As shown in FIG. 4, the waveform equalizing circuit 15 has a first differentiating circuit 31, an adding circuit 32, a second differentiating circuit 33 and a subtracting circuit 34. The first differentiating circuit 31 and the adding circuit 32 constitute a differentiating and adding circuit. The second differentiating circuit 33 and the subtracting circuit 34 constitute a differentiating and subtracting circuit.

The first differentiating circuit 31 differentiates the voltage signal (first differentiation target signal) with respect to time to generate a first differentiation result signal. The adding circuit 32 adds the first differentiation result signal (i.e. the voltage signal obtained by the differentiation) to the first differentiation target signal (i.e. the voltage signal before the differentiation). The voltage signal obtained by adding the first differentiation target signal and the first differentiation result signal is a second differentiation target signal. The second differentiating circuit 33 differentiates the second differentiation target signal output from the adding circuit 32 with respect to time to generate a second differentiation result signal. The subtracting circuit 34 subtracts the second differentiation result signal (i.e. the voltage signal obtained by the differentiation by the second differentiating circuit 33) from the second differentiation target signal (i.e. the voltage signal before the differentiation by the second differentiating circuit 33). For example, the first differentiating circuit 31 and the second differentiating circuit 33 each has a capacitor and a resistor.

As shown in FIG. 2, the analog signal output from the waveform equalizing circuit 15 (subtracting circuit 34) is input to the AD converter 16 to be converted to a digital signal. The digital signal is input to the control processing circuit 9 shown in FIG. 1.

Figure 5:
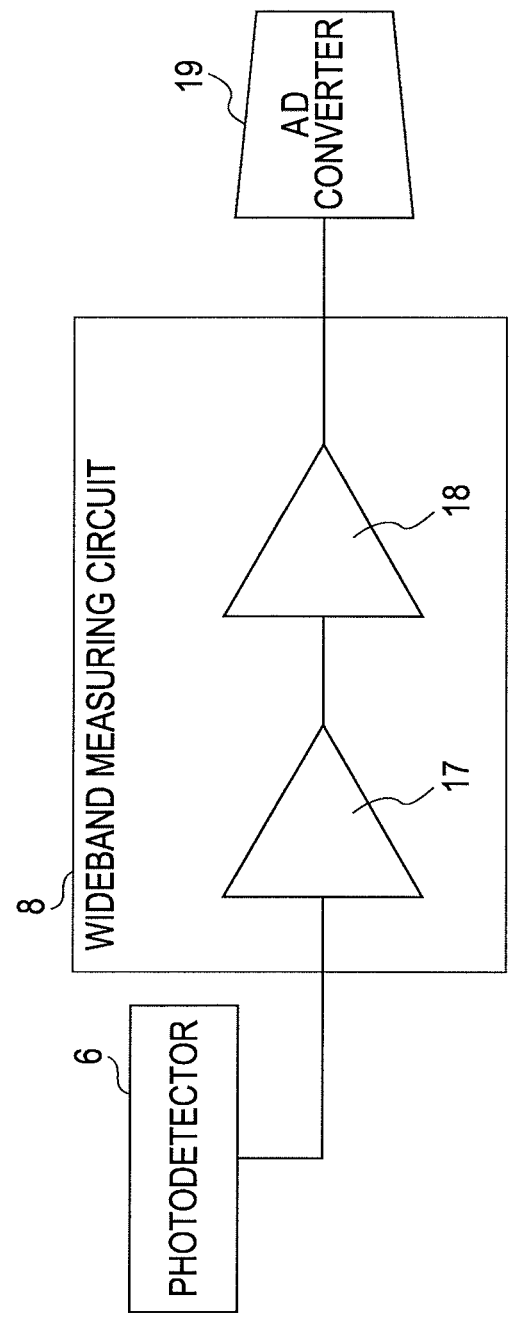
FIG. 5 is a block diagram of a configuration of a wideband measuring circuit.

The wideband measuring circuit 8 measures the characteristics of the fiber with regard to a wide frequency bandwidth. The wideband measuring circuit 8 detects the Rayleigh scattered light and/or the Fresnel reflected light. As a result, change in the bending loss is measured. FIG. 5 shows a configuration of the wideband measuring circuit 8. The wideband measuring circuit 8 has a converter and amplifier circuit 17 and an amplifier circuit 18, and is connected to an AD converter 19. The converter and amplifier circuit 17 has the same configuration as that of the converter and amplifier circuit 11 mentioned above. The converter and amplifier circuit 17 converts the current generated by the photodetector 6 into a voltage signal. The amplifier circuit 18 amplifies the voltage signal and outputs the amplified voltage signal to the AD converter 19. The AD converter 19 converts the analog voltage signal into a digital signal and outputs the digital signal to the control processing circuit 9.

The control processing circuit 9 shown in FIG. 1 performs signal processing on the voltage signal output from the narrowband measuring circuit 7 or the wideband measuring circuit 8. The control processing circuit 9 displays a result of the signal processing on the display device 10. For example, the display device 10 is an image display device and the like. The control processing circuit 9 controls the driver circuit 3 as well. In accordance with an instruction from the control processing circuit 9, the driver circuit 3 supplies the driving power to the laser diode 4. As a result, the laser diode 4 emits the laser light.

The fiber measurement device 1 has the configuration as described above.

Next, an operation of the fiber measurement device 1 will be described. Here, two types of measurement, PON section measurement and ONU measurement will be described. In a case of a PON (Passive Optical Network) system, a fiber and an optical splitter are provided between an OLT (Optical Line Terminal) and an ONU (Optical Network Unit) installed in a customer's home or a private area. A PON section is a section between the OLT and the optical splitter.

Figure 6A:
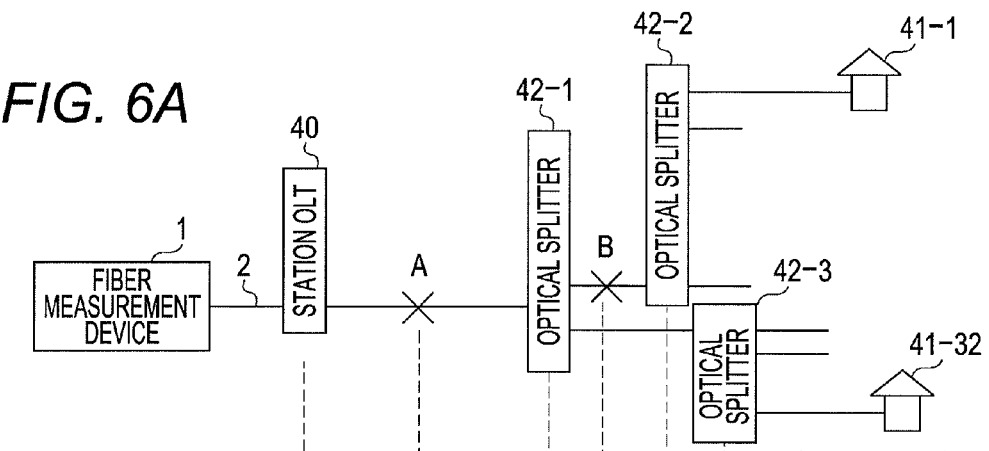
FIGS. 6A to 6D are diagrams of examples of PON section measurement.

As shown in FIG. 6A, the fiber measurement device 1 is connected to an OLT (station OLT) 40 through the fiber 2. A fiber extending from the OLT 40 is branched into two fibers by an optical splitter 42-1. The respective fibers are further branched by optical splitters 42-2 and 42-3 into 16 fibers. As a result, the one fiber is branched into 32 fibers. The 32 fibers are connected to ONUs 41-1 to 41-32, respectively.

The PON section measurement is performed by the wideband measuring circuit 8 shown in FIG. 1. In this case, the switches S1 and S2 are turned ON and the switches S3 and S4 are turned OFF. As a result, the wideband measuring circuit 8 is activated and the narrowband measuring circuit 7 is deactivated. In the measurement, the driver circuit 3 supplies the driving power to the laser diode 4 and thereby the laser light is emitted. The laser light is transferred by the optical coupler 5 to the optical fiber 2 and reaches the OLT 40 shown in FIG. 6A.

After that, the laser light is input to the fiber extending from the OLT 40 to the optical splitter 42-1, branched into two lines by the optical splitter 42-1 and then branched into 32 lines by the optical splitters 42-2 and 42-3. In the fiber, Rayleigh scattered light and Fresnel reflected light are generated. The Rayleigh scattered light and the Fresnel reflected light are input to the fiber measurement device 1 through the OLT 40 and the fiber 2.

In the fiber measurement device 1, the Rayleigh scattered light and the Fresnel reflected light are transferred by the optical coupler 5 to be input to and detected by the photodetector 6. A current caused by the detection is input to the wideband measuring circuit 8. The current is converted into a voltage signal by the converter and amplifier circuit 17. The voltage signal is amplified by the amplifier circuit 18. The amplified analog voltage signal is converted into a digital signal by the AD converter 19. The control processing circuit 9 performs processing on the digital signal. In this manner, the characteristics of the fiber 2 are measured.

Figure 6B:
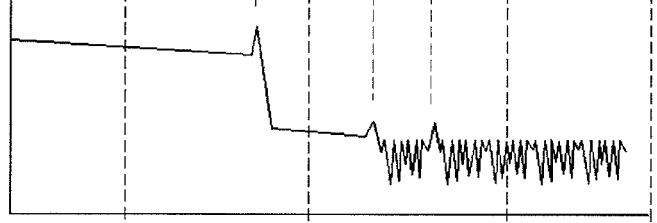
Figure 6C:
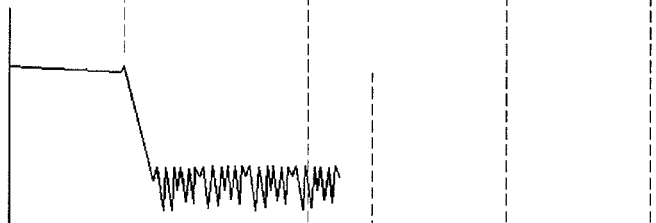

FIG. 6B shows a measurement result in a case (normal case) where no failure occurs in the fibers extending from the OLT 40 to the ONUs 41-1 to 41-32. Reflected light from the fibers at positions corresponding to the optical splitters 42-1 to 42-3 can be observed. FIG. 6C shows a measurement result in a case where a failure occurs at a position A (see FIG. 6A) in the fiber between the OLT 40 and the optical splitter 42-1. In this case, large loss is caused at the position A where the failure occurs. Therefore, the Rayleigh scattered light from the position A cannot be observed. It is thus possible to detect that the failure is occurring in the section.

Figure 6D:
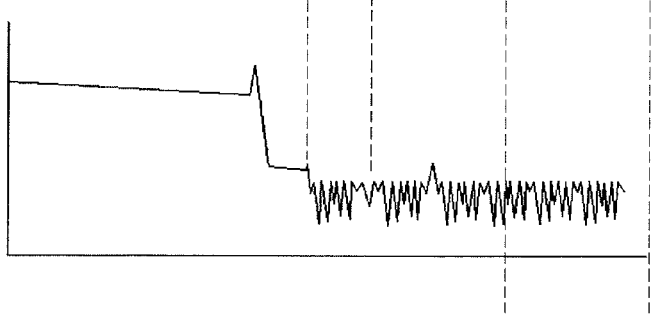

FIG. 6D shows a measurement result in a case where a failure occurs at a position B (see FIG. 6A) in the fiber between the optical splitter 42-1 and the optical splitter 42-2. In this case, loss is caused at the position B where the failure occurs. Therefore, the Rayleigh scattered light from the position B cannot be observed. It is thus possible to detect that the failure is occurring in the section. The section between the OLT 40 and the optical splitters 42-2 and 42-3 corresponds to a wide frequency bandwidth. In the case where the characteristics of the fiber in this section are measured, a measurement mode of the fiber measurement device 1 is set to the PON section measurement mode. In this mode, the wideband measuring circuit 8 is used. As a result, the failure of the fiber installed in the section corresponding to the wide frequency bandwidth can be measured (detected).

In a case where the characteristics of the fiber installed in a distant section (ONU section) from the optical splitters 42-2 and 42-3 to the ONUs 41-1 to 41-32 are measured with high resolution, the measurement mode of the fiber measurement device 1 is switched to the ONU measurement mode. Switching from the PON section measurement mode to the ONU measurement mode is achieved by turning off the switches S1 and S2 and turning on the switches S3 and S4 of the fiber measurement device 1. As a result, the wideband measuring circuit 8 is deactivated and the narrowband measuring circuit 7 is activated.

The section from the optical splitters 42-2 and 42-3 to the ONUs 41-1 to 41-32 is located at a position distant from the OLT 40. Meanwhile, a distance from the optical splitters 42-2 and 42-3 to the ONUs 41-1 to 41-32 is short. Moreover, a difference between distances from the OLT 40 to the respective ONUs 41-1 to 41-32 is very small. A total reflection device is installed in each of the ONUs 41-1 to 41-32 in order to measure the characteristics of the fiber connected to each of the ONUs 41-1 to 41-32. As a result, the laser light output from the fiber measurement device 1 and branched into 32 lines is totally reflected by the total reflection device.

The totally reflected laser light (feedback light) is input to the fiber measurement device 1. In this case, interference of the feedback light (reflected wave) occurs because a difference between distances from the OLT 40 to the respective ONUs 41-1 to 41-32 is very small. Although the conventional OTDR (that is, the wideband measuring circuit 8) can measure the characteristics of the fiber installed in the section corresponding to the wide frequency bandwidth, it cannot achieve a high-resolution measurement. Therefore, the fiber measurement device 1 performs a measurement in the ONU measurement mode, namely, performs a measurement by using the narrowband measuring circuit 7.

Figure 7A:
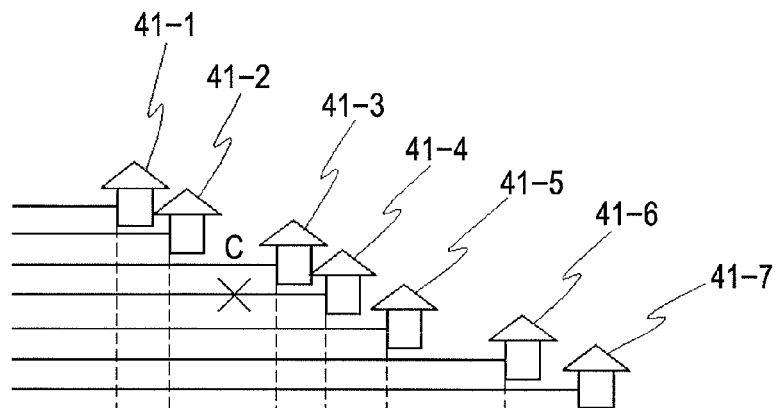
FIGS. 7A to 7C are diagrams of examples of ONU measurement.

FIG. 7A shows the ONUs 41-1 to 41-7 among the ONUs 41-1 to 41-32 shown in FIG. 6A. The total reflection device is installed in each of the ONUs 41-1 to 41-7. Therefore, the laser light transferred to each of the ONUs 41-1 to 41-7 through the fiber is totally reflected by the total reflection device. The totally reflected laser light is collected by the optical splitters 42-1 to 42-3 and then input to the fiber measurement device 1. In this case, interference of the totally reflected light from the respective ONUs occurs.

In the fiber measurement device 1, the totally reflected laser light (feedback light) input through the optical coupler 5 is detected by the photodetector 6. A current signal depending on each laser light is generated and input to the narrowband measuring circuit 7. The current signal is converted into a voltage signal by the converter and amplifier circuit 11. After that, a frequency bandwidth of the voltage signal is limited by the band limiting circuit 12. The band limiting circuit 12 allows transmission of light of a frequency bandwidth corresponding to the pulse width of the laser light emitted from the laser diode 4. Therefore, a frequency component of the feedback light is limited to that belonging to the frequency bandwidth, and the other frequency component is cut off.

Figure 8:
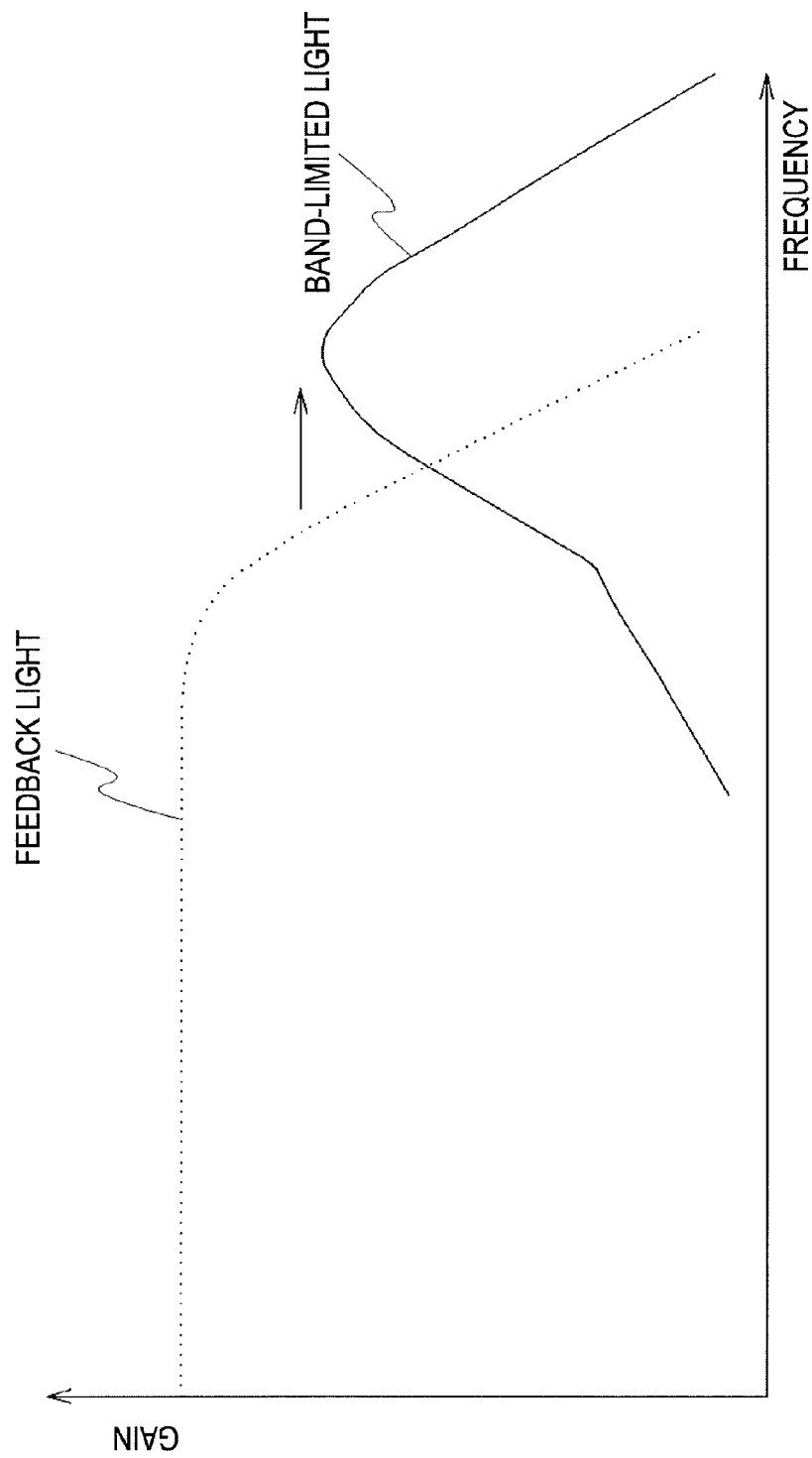
FIG. 8 is a diagram of a relationship between gain and frequency before and after band limiting.
Figure 9:
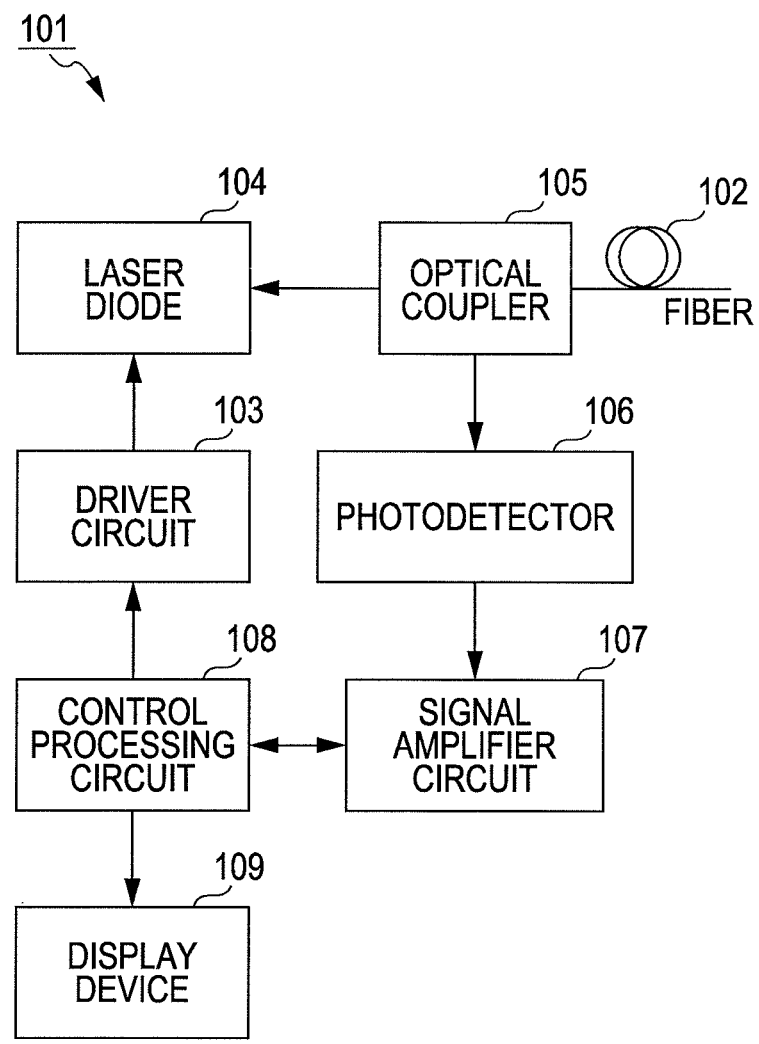
FIG. 9 is a block diagram of a configuration of a conventional fiber measurement device.
Figure 10:
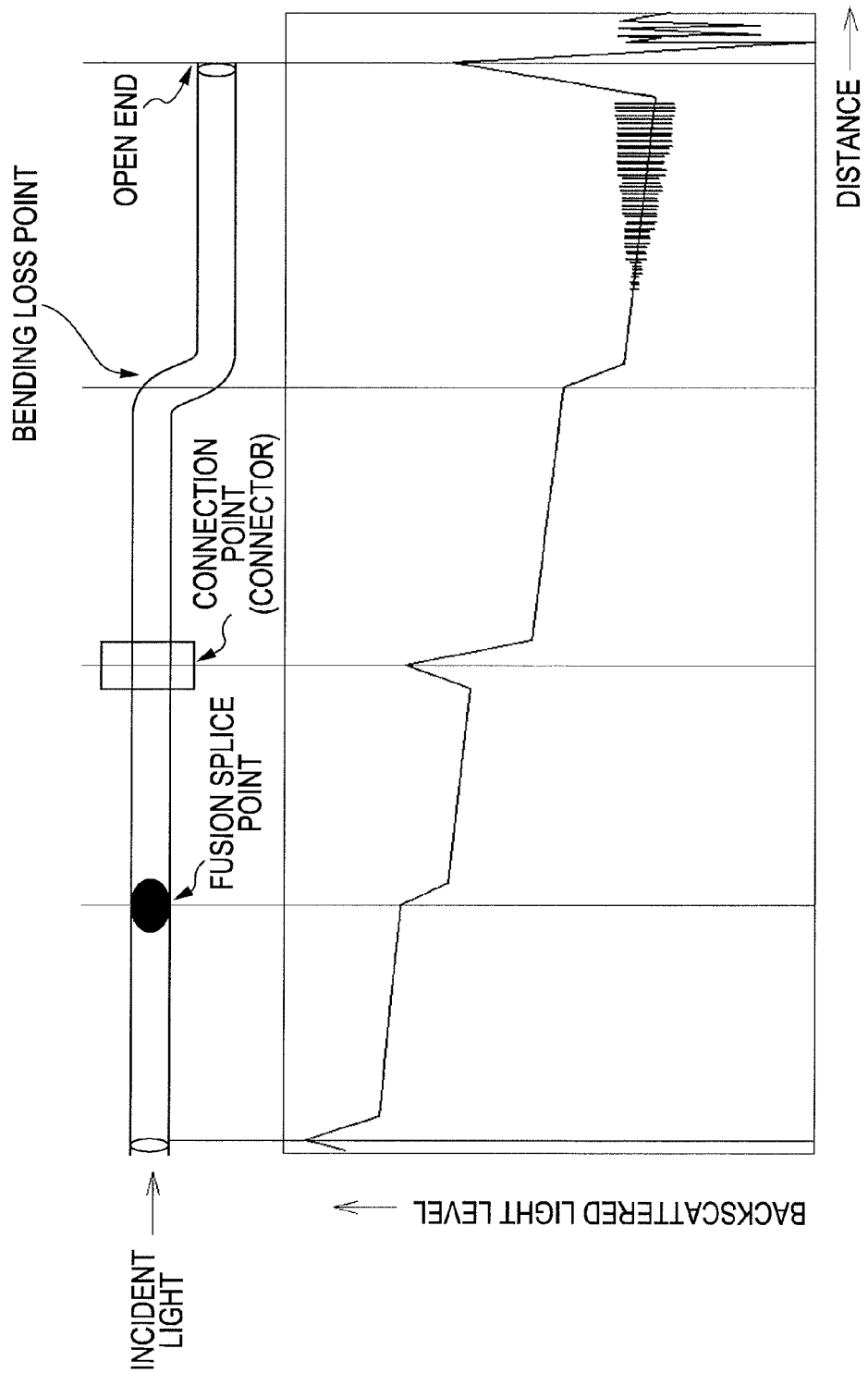
FIG. 10 is a diagram for describing fiber characteristics measurement.

In FIG. 8, a dashed line represents a relationship between frequency and gain of the feedback light, and a solid line represents a relationship between frequency and gain of the light (transmitted light) passing through the band limiting circuit 12. As represented by the dashed line in FIG. 8, the feedback light has the frequency component in a range from DC to low frequency. On the other hand, the band limiting circuit 12 extracts a component of high-frequency (the frequency bandwidth of the laser light) from the feedback light, as represented by the solid line.

The frequency component in the range from DC to low frequency includes a noise component. The noise component includes noise generated in the laser light and the feedback light during transmission in the fiber and noise generated by an electric circuit. So the band limiting circuit 12 extracts a high-frequency component corresponding to the frequency bandwidth of the laser light. Therefore, the noise component can be removed and thus the S/N ratio can be improved. As a result, a signal discrimination level (dynamic range) can be improved.

Figure 3B:
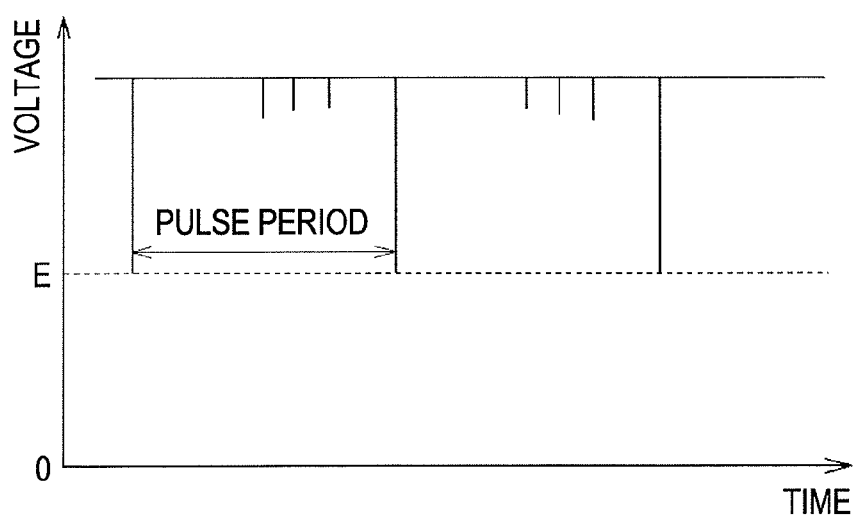
FIG. 3B is a diagram of an example of waveform.

The bias voltage is superimposed by the bias circuit 13 on the voltage signal of the band-limited feedback light. As shown in FIG. 3B, a level of the voltage signal of the feedback light has a certain peak. The peak of the voltage signal can be fixed by superimposing the bias voltage. Therefore, the voltage signal can be prevented from being saturated. As a result, the peak of the voltage signal can be displayed on the display device 10.

The voltage signal on which the bias voltage is superimposed is amplified by the amplifier circuit 14 and then input to the waveform equalizing circuit 15. The first differentiating circuit 31 of the waveform equalizing circuit 15 differentiates the voltage signal (or waveform). Then, the adding circuit 32 adds the voltage signal obtained by the differentiation (i.e. the first differentiation result signal) and the voltage signal before the differentiation (i.e. the first differentiation target signal).

The differentiating and adding circuit having the first differentiating circuit 31 and the adding circuit 32 corrects a rising edge of waveform of the voltage signal. As a result, rising characteristics of waveform are improved. Therefore, a rising portion of the reflection peak can be detected with high resolution. The voltage signal obtained by the above-mentioned differentiation and adding is input to the second differentiating circuit 33.

The second differentiating circuit 33 differentiates the voltage signal output from the adding circuit 32. Then, the subtracting circuit 34 subtracts the voltage signal obtained by the differentiation (i.e. the second differentiation result signal) from the voltage signal before the differentiation (i.e. the second differentiation target signal). The differentiating and subtracting circuit having the second differentiating circuit 33 and the subtracting circuit 34 corrects a falling edge of waveform. As a result, falling characteristics of waveform are improved. Therefore, a falling portion of the reflection peak can be detected with high resolution.

Therefore, as shown in FIG. 4, even when reflection peaks are in clumps due to interference of the feedback light (even when Reflection-1 and Reflection-2 are hard to be distinguished from each other due to interference), the reflection peaks can be separated and distinguished from each other. That is, the noise component is removed due to the band limitation by the band limiting circuit 12. Furthermore, the waveform equalizing circuit 15 performs the differentiation-adding and the differentiation-subtraction, which can separate the reflection peaks having been in clumps due to interference into two peaks.

Figure 7B:
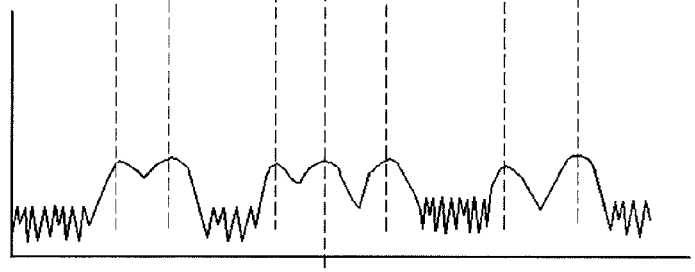

FIG. 7B shows a waveform of the totally reflected light from the ONUs 41-1 to 41-7 in a case where no failure occurs in the fiber. As shown in FIG. 7B, respective peaks of the totally reflected light from the ONUs 41-1 to 41-7 are separated from each other by the band limiting circuit 12 and the waveform equalizing circuit 15. In this manner, the reflection peaks are clearly separated from each other. Therefore, the reflection characteristics of the respective ONUs 41-1 to 41-7 can be measured.

Figure 7C:
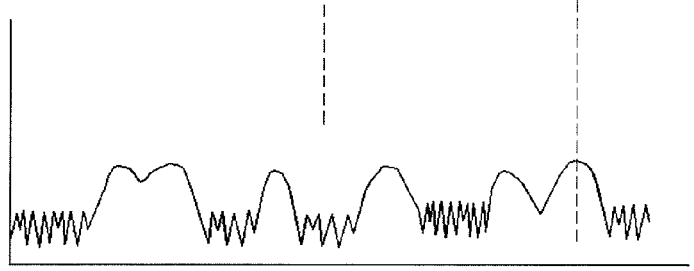

FIG. 7C shows a waveform in a case where a failure occurs at a position C (see FIG. 7A) in the fiber connected to the ONU 41-4. In this case, the laser light does not reach the ONU 41-4. Therefore, the totally reflected light is not generated from the ONU 41-4. That is, the reflection peak regarding the ONU 41-4 is not detected in the fiber measurement device 1. It is thus possible to detect that a failure is occurring in the fiber connected to the ONU 41-4.

In this manner, in the ONU measurement mode, the reflection peaks are separated from each other by the band limiting circuit 12 and the waveform equalizing circuit 15. Therefore, the reflection characteristics of the fiber can be measured with high resolution. In other words, even when the interference of the totally reflected light from the ONUs 41-1 to 41-32 respective distances to which from the OLT 40 are almost the same occurs, the respective reflection peaks can be separated from each other. Therefore, the characteristics of the fiber can be measured with high resolution. Moreover, each member of the narrowband measuring circuit 7 is an analog circuit. It is thus possible to perform the measurement by using high-power laser light instead of using weak pulsed light as used in the photon counting method. As a result, the characteristics of the fiber (long distance fiber) at a position distant from the OLT 40 can be measured. That is, the ONU measurement mode enables the measurement of the characteristics of the long distance fiber with high resolution.

Furthermore, each of the band limiting circuit 12 and the waveform equalizing circuit 15 is achieved by a simple analog circuit. That is, there is no need to prepare a complicated processing circuit for making the band limiting circuit 12 and the waveform equalizing circuit 15. Therefore, the fiber measurement device 1 can be achieved by a simple circuit. Moreover, the fiber measurement device 1 does not require processing of counting the number of photons that is required in the case of the photon counting method. As a result, the fiber measurement device 1 enables real-time and high-speed display of the waveform on the display device 10.

As described above, in the fiber measurement device 1, the switch is controlled such that the wideband measuring circuit 8 is used in a case such as the PON section measurement where the characteristics of the fiber regarding a wide frequency bandwidth are measured. On the other hand, the switch is controlled such that the narrowband measuring circuit 7 is used in a case such as the ONU measurement where the reflection characteristics of the long distance fiber are measured with high resolution. As a result, a single fiber measurement device 1 can achieve both types of the measurement.

In the present embodiment, the waveform equalizing circuit 15 has the differentiating and adding circuit (the first differentiating circuit 31 and the adding circuit 32) and the differentiating and subtracting circuit (the second differentiating circuit 33 and the subtracting circuit 34). However, the configuration is not limited to that. The waveform equalizing circuit 15 may not have the differentiating and subtracting circuit. The differentiating and adding circuit enables detection of the rising of the waveform with high resolution. As a result, the waveform equalizing circuit 15 may separate and distinguish two reflection peaks of the feedback light. In this case, the waveform equalizing circuit 15 can achieve the high-resolution measurement even without the differentiating and subtracting circuit. It should be noted that the reflection peaks can be distinguished more clearly by using both of the differentiating and adding circuit and the differentiating and subtracting circuit. That is, the measurement can be achieved with further high resolution.

Moreover, each of the first differentiating circuit 31 and the second differentiating circuit 33 may differentiate the voltage signal with respect to a time axis. The wideband measuring circuit 8 may be a circuit for measuring the characteristics of a wide range of section of the fiber. The wideband measuring circuit 8 may measure change in the Rayleigh scattered light, the reflected light and the bending loss, as in the case of a conventional OTDR.

Moreover, the fiber measurement device according to the present disclosure may be any of the following first to fourth fiber measurement devices. The first fiber measurement device has: a light detector adapted to detect feedback light of laser light output to a fiber; a band limiting circuit adapted to extract a component corresponding to a frequency of the laser light from a signal of the feedback light detected by the light detector; and a waveform equalizing circuit having a differentiating and adding circuit adapted to differentiate waveform of the signal band of which is limited by the band limiting circuit and to add the differentiated signal to the pre-differentiation signal.

The first fiber measurement device is provided with the band limiting circuit and the waveform equalizing circuit. As a result, the characteristics of the fiber can be measured with high resolution. Moreover, high-power laser light can be used. Therefore, reflection measurement can be performed on the long distance fiber. Furthermore, the first fiber measurement device does not use a complicated processing circuit. Thus, the measurement can be performed in real time by simple processing by a simple circuit.

In the second fiber measurement device, the waveform equalizing circuit further has a differentiating and subtracting circuit, in addition to the first fiber measurement device. The differentiating and subtracting circuit differentiates waveform of the signal obtained by the differentiating and adding circuit and subtracts the differentiated signal from the pre-differentiation signal.

Rising edge of waveform can be detected by the differentiating and adding circuit. Moreover, falling edge of waveform can be detected by the differentiating and subtracting circuit. Therefore, the resolution of measurement can be further increased.

The third fiber measurement device further has: a narrowband measuring circuit having the band limiting circuit and the waveform equalizing circuit; a wideband measuring circuit adapted to amplify the feedback light from the fiber and to measure characteristics of the fiber based on loss of the feedback light; and a switch adapted to switch between the narrowband measuring circuit and the wideband measuring circuit, in addition to the first fiber measurement device or the second fiber measurement device.

According to this configuration, when the characteristics of the long distance fiber are measured with high resolution, the switch is controlled such that the narrowband measuring circuit is selected. On the other hand, when the characteristics of the fiber with regard to a wide frequency bandwidth are measured, the switch is controlled such that the wideband measuring circuit is used. As a result, a single fiber measurement device can achieve both the measurement of the characteristics of the long distance fiber with high resolution and the measurement of the characteristics of the fiber with regard to a wide frequency bandwidth.

The fourth fiber measurement device further has a bias circuit in addition to the third fiber measurement device. The bias circuit biases the signal in order to achieve display of the peak level of the signal.

By using the bias circuit, the peak level of the signal can be displayed in a recognizable manner.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A fiber measurement device, comprising:
    a light detector adapted to
        detect feedback light of laser light output to a fiber from the fiber, and
        convert the feedback light into an electrical signal;
    a narrowband measuring circuit;
    a wideband measuring circuit adapted to amplify the feedback light from the fiber, and measure characteristics of the fiber based on loss of the feedback light; and
    a switch adapted to switch between the narrowband measuring circuit and the wideband measuring circuit to input the electrical signal from the light detector, wherein
    the narrowband measuring circuit includes:
        a band limiting circuit adapted to extract, from the electrical signal from the light detector, a signal having a component corresponding to a frequency of the laser light, wherein the signal extracted by the band limiting circuit is a first differentiation target signal; and
        a waveform equalizing circuit comprising a differentiating and adding circuit, including a first differentiating circuit and adding circuit, wherein the first differentiating circuit is adapted to calculate the differential of the first differentiation target signal from the band limiting circuit to generate a first differentiation result signal, and the adding circuit is adapted to add the first differentiation target signal and the first differentiation result signal generated in the first differentiating circuit together.

2. The fiber measurement device according to claim 1, wherein a signal obtained by adding the first differentiation target signal and the first differentiation result signal in the differentiating and adding circuit is a second differentiation target signal, and
    wherein the waveform equalizing circuit further comprises a differentiating and subtracting circuit including a second differentiating circuit and a subtracting circuit, wherein
        the second differentiating circuit is adapted to calculate the differential of the second differentiation target signal to generate a second differentiation result signal, and
        the subtracting circuit is adapted to subtract the second differentiation result signal generated in the second differentiating circuit from the second differentiation target signal.

3. The fiber measurement device according to claim 1, wherein the narrowband measuring circuit further comprises a bias circuit adapted to bias the first differentiation target signal.

4. The fiber measurement device according to claim 2, wherein the narrowband measuring circuit further comprises a bias circuit adapted to bias the first differentiation target signal.

5. The fiber measurement device according to claim 1, wherein the band limiting circuit includes a bandpass filter comprising a capacitor.

6. The fiber measurement device according to claim 1, wherein a differentiation of the first differentiation target signal and an addition of the first differentiation target signal and the first differentiation result signal are configured to compensate for a rising edge of a peak of the electrical signal.

7. The fiber measurement device according to claim 2, wherein a differentiation of the second differentiation target signal and an addition of the second differentiation target signal and the second differentiation result signal are configured to compensate for a falling edge of a peak of the electrical signal.

* * * * *